(12) United States Patent
Lou et al.

(10) Patent No.: US 11,588,706 B2
(45) Date of Patent: Feb. 21, 2023

(54) METHOD FOR DESIGNING DISTRIBUTED COMMUNICATION TOPOLOGY OF MICRO-GRID BASED ON NETWORK MIRRORING AND GLOBAL PROPAGATION RATES

(71) Applicant: SOUTHEAST UNIVERSITY, Nanjing (CN)

(72) Inventors: Guannan Lou, Nanjing (CN); Yinqiu Hong, Nanjing (CN); Wei Gu, Nanjing (CN); Xiaoyu Jiang, Nanjing (CN); Shanlin Li, Nanjing (CN); Quan Yang, Nanjing (CN); Lina Sheng, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 216 days.

(21) Appl. No.: 17/283,257

(22) PCT Filed: Apr. 2, 2020

(86) PCT No.: PCT/CN2020/082957
§ 371 (c)(1),
(2) Date: Apr. 7, 2021

(87) PCT Pub. No.: WO2021/174625
PCT Pub. Date: Sep. 10, 2021

(65) Prior Publication Data
US 2022/0094603 A1    Mar. 24, 2022

(30) Foreign Application Priority Data

Mar. 5, 2020 (CN) .......................... 201911308689.3

(51) Int. Cl.
*H04L 41/12* (2022.01)
*H04L 41/14* (2022.01)
*H02J 13/00* (2006.01)

(52) U.S. Cl.
CPC ...... *H04L 41/145* (2013.01); *H02J 13/00022* (2020.01); *H04L 41/12* (2013.01)

(58) Field of Classification Search
CPC ........... H02J 13/00002; H02J 13/00022; H02J 3/388; H04L 41/12; H04L 41/145
See application file for complete search history.

(56) References Cited

U.S. PATENT DOCUMENTS 10,284,011 B2 *  5/2019  Chakraborty ..... H02J 13/00002
10,809,678 B2 * 10/2020  Nasirian ................. G05B 15/02
(Continued)

FOREIGN PATENT DOCUMENTS

CN    108599974 A    9/2018
CN    110380408 A   10/2019
CN    110611333 A   12/2019

*Primary Examiner* — Syed Ali
(74) *Attorney, Agent, or Firm* — Bayramoglu Law Offices LLC (57) ABSTRACT

A method for designing a distributed communication topology of a micro-grid based on network mirroring and global propagation rates includes the following steps: first, determining the communication connectivity of distributed directed networks in the micro-grid; next, obtaining, for connected directed communication networks, mirror networks thereof based on a mirroring operation, and selecting an optimal distributed directed communication topology corresponding to a maximum performance indicator based on algebraic connectivity and communication costs; solving, for the optimized distributed communication topology, pinned distributed generation sets corresponding to different pinning numbers based on global propagation rates and out-degrees; and finally, establishing a distributed secondary (Continued)

voltage control of the micro-grid based on the optimal distributed communication network and pinned nodes of the micro-grid, to achieve accurate reactive power sharing and average voltage restoration.

8 Claims, 9 Drawing Sheets

(56) References Cited

U.S. PATENT DOCUMENTS

| | | | |
|---|---|---|---|
| 2018/0152022 A1 | 5/2018 | Manson | |
| 2019/0052083 A1* | 2/2019 | Lucas, Jr. | H02J 3/18 |
| 2019/0103743 A1* | 4/2019 | Sun | H02J 13/00004 |
| 2020/0025810 A1* | 1/2020 | Bernstein | G02B 6/3885 |
| 2020/0036748 A1* | 1/2020 | Tebekaemi | H02J 13/0017 |
| 2020/0083714 A1* | 3/2020 | Asawa | H02J 3/144 |
| 2020/0106269 A1* | 4/2020 | Hannon | H02J 13/00034 |
| 2020/0176984 A1* | 6/2020 | Bota | H02J 13/00006 |
| 2020/0403406 A1* | 12/2020 | Shafiullah | H02J 13/00002 |
| 2021/0152018 A1* | 5/2021 | Lin | G05B 13/0265 |

* cited by examiner

METHOD FOR DESIGNING DISTRIBUTED COMMUNICATION TOPOLOGY OF MICRO-GRID BASED ON NETWORK MIRRORING AND GLOBAL PROPAGATION RATES

CROSS REFERENCE TO THE RELATED APPLICATIONS

This application is the national phase entry of International Application No. PCT/CN2020/082957, filed on Apr. 2, 2020, which is based upon and claims priority to Chinese Patent Application No. 201911308689.3, filed on Mar. 5, 2020, the entire contents of which are incorporated herein by reference.

TECHNICAL FIELD

The present invention relates to the field of micro-grid operation control technology, and particularly to a method for designing a distributed communication topology of a micro-grid based on network mirroring and global propagation rates.

BACKGROUND

With the exhaustion of earth resources and people's attention to environmental issues, access of renewable energy resources is increasingly valued by countries around the world. The micro-grid is an emerging energy transmission mode that increases the permeability of renewable energy resources and distributed energy resources in energy supply systems. The micro-grid includes different types of distributed energy resources (DERs, including micro gas turbines, wind driven generators, photovoltaics, fuel cells, energy storage equipment, etc.), user terminals of various electrical loads and/or thermal loads and related monitoring and protection devices.

The energy conversion of the internal power sources of micro-grid mainly lies in power electronic devices, which also provide necessary control; the micro-grid is a single controlled unit with respect to an external grid, and can meet the requirements of users for power quality, power supply security and the like at the same time. The energy is exchanged between the micro-grid and the main grid through a point of common coupling, and the two are mutually standby, thus enhancing the reliability of power supply. Since the micro-grid is a small-scale decentralized system and is close to the load, it can increase the reliability of local power source, reduce the network loss and greatly increase the energy utilization efficiency, and is a new power supply mode that meets the requirements of future smart grid development.

Under normal circumstances, the micro-grid operates in grid-connected mode, and is supported by the main grid in voltage and frequency. When an emergency or planned event causes the micro-grid to be off-grid, the micro-grid will work in an autonomous state. The droop control strategy has gained wide attention because it does not require the communication between distributed generations. When the micro-grid needs to be switched from the grid-connected mode to the islanding mode, each distributed generation can automatically share the load power in the micro-grid. However, the droop control will cause a steady-state deviation of the voltage due to its intrinsic properties, and the effect of reactive power sharing is not ideal considering the diversity of output impedances of different distributed generations. Therefore, secondary cooperative control is required to assist voltage recovery and appropriate reactive power allocation. The consensus theory is an effective way to realize cooperative control. In large-scale systems, considering factors such as communication cost and network complexity, a directed distributed communication topology based on pinning consensus has been widely used. With the development of open communication modes, especially wireless communication, communication topology design has become the focus of distributed secondary control. In order to reduce communication cost and improve system convergence performance, it is necessary to optimize the design of the directed communication topology and the pinned distributed generation set to improve the dynamic performance of the system.

SUMMARY

The technical problem to be solved by the present invention is to provide a method for designing a distributed communication topology of a micro-grid based on network mirroring and global propagation rates. A directed communication network topology optimization indicator and calculation method considering system convergence performance and network communication cost are proposed based on a topology optimization design method in an undirected network, and a pinned set optimization indicator considering system convergence performance is proposed for an optimal communication topology, so as to provide a basis for the design of a control structure of distributed secondary control, thus achieving accurate reactive power sharing and average voltage restoration with an improved dynamic performance of the micro-grid.

In order to solve the above technical problems, the present invention adopts the following technical solution: the present invention proposes a method for designing the distributed communication topology of the micro-grid based on network mirroring and global propagation rates, used to implement information interaction in the droop operation mode of an islanded micro-grid, including the following steps:

step A, determining a connectivity of all distributed directed communication networks in the micro-grid, selecting connected distributed directed communication networks as candidate communication networks, and then proceeding to step B;

step B, obtaining mirror networks of the candidate communication networks based on a mirroring operation, obtaining an algebraic connectivity and a communication cost corresponding to each mirror network, selecting an optimal distributed directed communication topology corresponding to a maximum performance indicator to obtain an optimal distributed directed communication network, and then proceeding to step C;

step C, solving, for the optimal distributed directed communication topology obtained in step B, pinned distributed generation sets corresponding to different pinning numbers based on the global propagation rates and out-degrees, and then proceeding to step D; and step D, establishing a distributed secondary voltage control of the micro-grid based on the optimal distributed directed communication network and the pinned distributed generation set of the micro-grid, to achieve accurate reactive power sharing and average voltage restoration.

As a preferred technical solution of the present invention, in step A, the connected distributed directed communication networks are selected from all the distributed directed communication networks of the micro-grid according to steps A01 and A02 below as the candidate communication networks of the micro-grid:

step A01, for a distributed communication topology, introducing a corresponding connectivity matrix as shown in the following formula:

$$RC = A + A^2 + \ldots + A^n \quad \text{formula (1)}$$

where RC represents the corresponding connectivity matrix of the distributed communication topology; A represents an adjacency matrix of the distributed directed communication topology, and the A is composed of connecting elements between distributed generations, $A = [a_{ij}]$; + represents a Boolean sum of the adjacency matrix, and $a_{ij}$ represents a direct communication connectivity from a j-th distributed generation to an i-th distributed generation in the micro-grid; and step A02, obtaining $RC = [r_{ij}]$ based on formula (1), where $r_{ij}$ represents a communication connectivity from the j-th distributed generation to the i-th distributed generation in the micro-grid, $r_{ij} = 1$ indicates that the communication connectivity presents from the j-th distributed generation to the i-th distributed generation in the micro-grid, and $r_{ij} = 0$ indicates that the communication connectivity does not present from the j-th distributed generation to the i-th distributed generation in the micro-grid; if all non-diagonal elements $r_{ij}$ in RC are equal to 1, the distributed directed communication network is a connected network; and if some non-diagonal elements $r_{ij}$ in RC are equal to 0, the distributed directed communication network is an unconnected network.

As a preferred technical solution of the present invention, in step B, an undirected mirror counterpart of each candidate directed communication network is obtained based on a mirroring operation according to steps B01 and B02 below:

step B01, based on the graph theory, using a directed graph $G = (\zeta, E, A)$ to represent the topology of each candidate communication network, where $\zeta$ is a set of distributed generation nodes, E represents a set of communication links in the distributed directed communication network, and A represents a direct connectivity in the distributed directed communication network; and step B02, for each candidate communication network represented by the directed graph, according to the following formula:

$$\begin{cases} \hat{E} = E \cup \overset{(}{E} \\ \hat{A} = [\hat{a}_{ij}], \hat{a}_{ij} = \hat{a}_{ji} = (a_{ij} + a_{ji})/2 \\ \hat{G} = M(G) = (V, \hat{E}, \hat{A}) \end{cases} \quad \text{formula (2)}$$

obtaining the undirected mirror counterpart $\hat{G}$ corresponding to each candidate communication network; where $\overset{(}{E}$ is a set of communication links obtained by reversing all information transfer directions in the directed communication topology.

As a preferred technical solution of the present invention, in step B, for each mirror network, according to the following formula:

$$\lambda_2(L(\hat{G})) = \min_{\substack{x \neq 0 \\ 1^T x = 0}} \frac{x^T L(\hat{G}) x}{\|x\|^2} \quad \text{formula (3)}$$

obtaining the algebraic connectivity $\lambda_2(L(\hat{G}))$ corresponding to each mirror network; where x represents a state variable of each distributed generation, and $L(\hat{G})$ is a Laplacian matrix of the undirected mirror graph $\hat{G}$, and the $L(\hat{G})$ can be obtained according to the following formula:

$$L(\hat{G}) = \frac{1}{2}(L + L^T) = \Delta - \frac{1}{2}(A + A^T) = \hat{\Delta} - \hat{A} \quad \text{formula (4)}$$

where L is a Laplacian matrix of the directed graph G, $\Delta$ is a diagonal matrix, and its diagonal element $\Delta_{ii}$ represents an out-degree of the i-th distributed generation in the directed communication topology.

In the meantime, for each mirror network, according to the following formula:

$$\text{Length} = \Sigma_{i,j=1}^n \text{sgn}(\hat{a}_{ij}) \quad \text{formula (5)}$$

the communication cost corresponding to each mirror network is obtained.

As a preferred technical solution of the present invention, in step B, for each candidate topology that meets the specified convergence performance requirement, a performance indicator is calculated based on a weighted sum of the algebraic connectivity and the communication cost, and the candidate directed distributed communication topology corresponding to the maximum performance indicator is selected as the optimal distributed directed communication topology of the micro-grid.

Aiming at each candidate topology that meets the specified convergence performance requirement, according to the following formula:

$$J(L) = \gamma_1 \lambda_2(L(\hat{G})) + \gamma_2 \text{Length} \quad \text{formula (6)}$$

the performance indicator J(L) corresponding to each candidate topology is obtained, and the candidate directed distributed topology corresponding to the maximum performance indicator is selected as the optimal distributed communication topology of the micro-grid, where $\lambda_2(L(\hat{G}))$ represents the algebraic connectivity corresponding to the candidate topology, and Length represents the communication cost corresponding to the candidate topology.

As a preferred technical solution of the present invention, in step C, for a pinned set including k distributed generations and one distributed generation in the corresponding unpinned set, according to the following formula:

$$\begin{cases} P_{k+1} = P_k \cup \{i\} \\ I_{k+1} = I_k \quad \{i\} \end{cases} \quad \text{formula (7)}$$

obtaining a candidate pinned set including (k+1) distributed generations and a corresponding unpinned set; where $\Pi_k$ represents the pinned set including k distributed generations, $I_k$ represents the unpinned set corresponding to the pinned set $\Pi_k$ which comprises k distributed generations, and i represents one distributed generation in the unpinned set.

As a preferred technical solution of the present invention, in step C, for each candidate pinned set including (k+1) distributed generations, according to the following formula:

$$\sum_{i \in P_{k+1}} \sum_{j \in I_{k+1}} \frac{1}{l(i,j)} \Big|_{\vec{d}(i)} \quad \text{formula (8)}$$

obtaining the global propagation rate corresponding to each candidate pinned set; where $l(i,j)|_{\vec{d}(i)}$ represents the length of the shortest communication path from the distributed generation i to the distributed generation j.

In the meantime, for each candidate pinned set including (k+1) distributed generations, according to the following formula:

$$deg(P_{k+1}) = \sum_{j \in P_{k+1}} \sum_{i \in I_{k+1}} a_{ij} \qquad \text{formula (9)}$$

the out-degree corresponding to each candidate pinned set is obtained.

As a preferred technical solution of the present invention, in step C, for each candidate pinned set including (k+1) distributed generations, an objective function value is calculated based on a sum of the global propagation rate and an out-degree of the pinned set, and the candidate pinned set corresponding to the maximum objective function value is selected as an optimal pinned distributed generation set with a pinning number (k+1).

For each candidate pinned set, according to the following formula:

$$f(P_{k+1}) = deg(P_{k+1}) + \sum_{j \in I_{k+1}} \sum_{\bar{d}(P_{k+1})} \frac{1}{l(P_{k+1}, j)} \qquad \text{formula (10)}$$

calculating the objective function value $f(P_{k+1})$ corresponding to each candidate pinned set; where $deg(P_{k+1})$ represents the out-degree of the candidate pinned set, $l(P_{k+1}, j)$ represents the length of the communication path from the candidate pinned set to the unpinned distributed generation j, and when there are multiple communication paths, a shorter path is preferred.

As a preferred technical solution of the present invention, in step C, a pinned distributed generation set $\Pi_0$ is initialized to an empty set, and a corresponding unpinned distributed generation set $I_0$ is a set of all distributed generations in the communication network, the above operations are cycled with the number of the distributed generations in the pinned set increased each time, and the pinned distributed generation sets corresponding to different pinning numbers are solved.

Compared with the prior art, the method for designing a distributed communication topology of a micro-grid based on network mirroring and global propagation rates introduced in the present invention, which adopts the above technical solution, has the following technical effects: the method for designing a distributed communication topology of a micro-grid based on network mirroring and global propagation rates obtains algebraic connectivity and communication costs of undirected mirror counterparts corresponding to directed distributed communication topologies by using a network mirroring method, then proposes a directed communication topology optimization indicator considering system convergence performance and network communication costs and a pinned set optimization indicator considering system convergence performance to optimize the communication topology, so as to provide a basis for the design of a control structure of distributed secondary control; the present invention extends the optimization design method of undirected communication network topologies to directed communication networks to expand the application range of the topology design method in the distributed communication networks of the micro-grid, and introduces the definition of the global propagation rate for the first time, which optimizes the design of the pinned distributed generation set, thus improving the control performance of the islanded micro-grid to facilitate the accurate reactive power allocation and voltage quality improvement in the micro-grid.

DETAILED DESCRIPTION OF THE EMBODIMENTS

The specific embodiments of the present invention will be further described in detail below in conjunction with the accompanying drawings.

Figure 1:
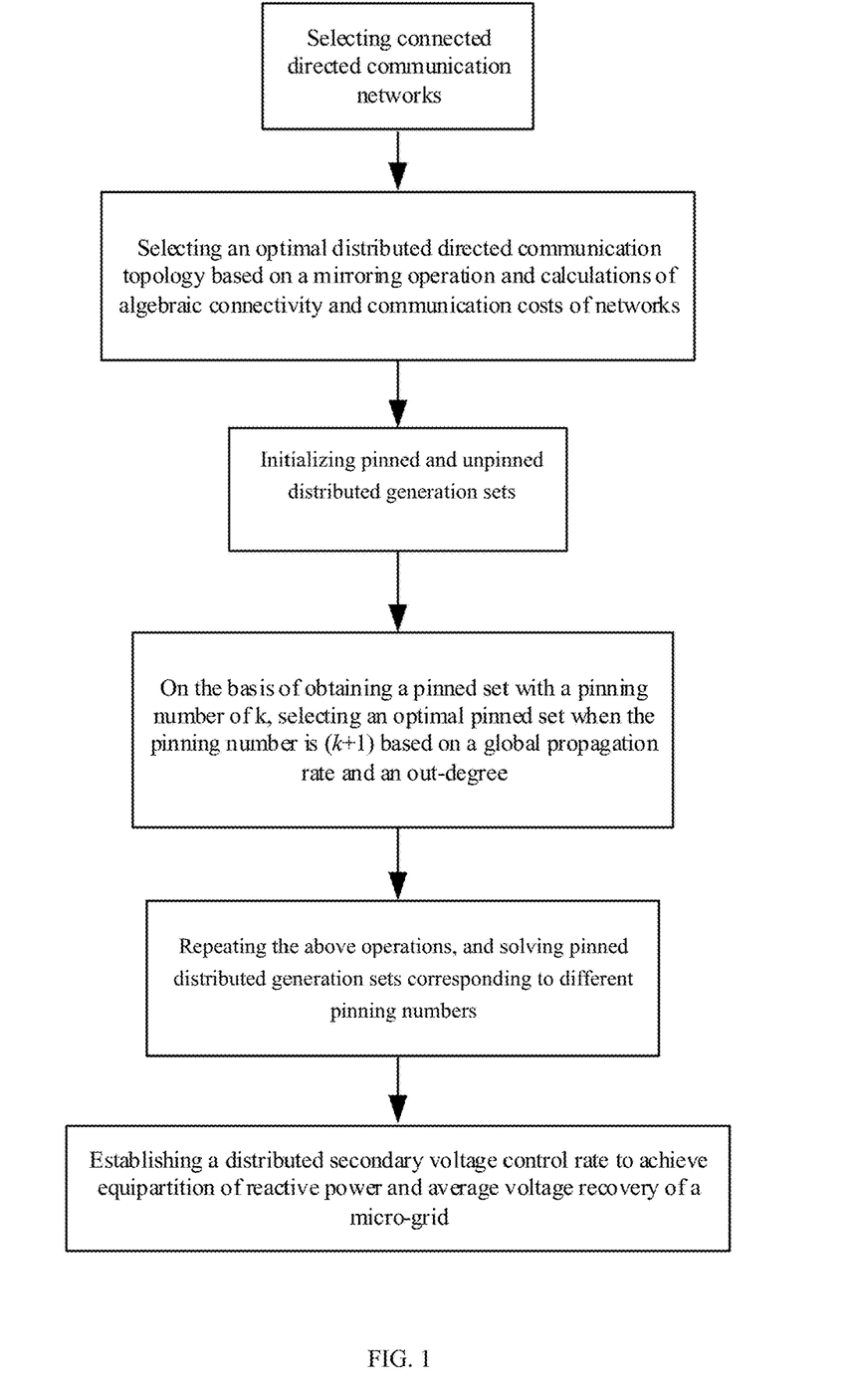
FIG. 1 is the flowchart of the method for designing the distributed communication topology of the micro-grid based on network mirroring and global propagation rates according to the present invention.

The present invention provides a method for designing the distributed communication topology of the micro-grid based on network mirroring and global propagation rates, which is used to implement information interaction in the droop operation mode of an islanded micro-grid. In practical applications, as shown in FIG. 1, the method specifically includes the following steps:

Step A, the connectivity of all distributed directed communication networks in the micro-grid are determined, connected directed communication networks are selected as candidate communication networks, and then step B is proceeded.

In step A above, the connected distributed directed communication networks are selected from all the distributed directed communication networks in the micro-grid according to steps A01 and A02 below as the candidate communication networks of the micro-grid:

Step A01, for a distributed communication topology, the corresponding connectivity matrix as shown in the following formula is introduced:

$$RC = A + A^2 + \ldots + A^n \quad \text{formula (1)}$$

Where RC represents the connectivity matrix of the distributed communication topology; A represents an adjacency matrix of the distributed directed communication topology, and the A is composed of connecting elements between distributed generations, $A = [a_{ij}]$; + represents the Boolean sum of the adjacency matrix, and $a_{ij}$ represents the direct communication connectivity from a j-th distributed generation to an i-th distributed generation in the micro-grid.

Step A02, $RC = [r_{ij}]$ is obtained based on formula (1), where $r_{ij}$ represents a communication connectivity from the j-th distributed generation to the i-th distributed generation in the micro-grid, $r_{ij} = 1$ indicates that the communication connectivity presents from the j-th distributed generation to the i-th distributed generation in the micro-grid, and $r_{ij} = 0$ indicates that the communication connectivity does not present from the j-th distributed generation to the i-th distributed generation in the micro-grid; if all non-diagonal elements $r_{ij}$ in RC are equal to 1, the distributed directed communication network is a connected network; and if some non-diagonal elements $r_{ij}$ in RC are equal to 0, the distributed directed communication network is an unconnected network.

Step B, mirror networks of the candidate communication networks are obtained based on a mirroring operation, an algebraic connectivity and a communication cost corresponding to each mirror network are obtained, an optimal distributed directed communication topology corresponding to a maximum performance indicator is selected to obtain an optimal distributed directed communication network, and then step C is proceeded.

In step B above, an undirected mirror counterpart of each candidate directed communication network is obtained based on the mirroring operation according to steps B01 and B02 below:

Step B01, based on the graph theory, a directed graph $G = (\zeta, E, A)$ is used to represent the topology of each candidate communication network, where $\zeta$ is a set of distributed generation nodes, E represents a set of communication links in the distributed directed communication network, and A represents a direct connectivity in the distributed directed communication network Step B02, for each candidate communication network represented by the directed graph, according to the following formula:

$$\begin{cases} \hat{E} = E \cup \breve{E} \\ \hat{A} = [\hat{a}_{ij}], \hat{a}_{ij} = \hat{a}_{ji} = (a_{ij} + a_{ji})/2 \\ \hat{G} = M(G) = (V, \hat{E}, \hat{A}) \end{cases} \quad \text{formula (2)}$$

the undirected mirror counterpart $\hat{G}$ corresponding to each candidate communication network is obtained; where $\breve{E}$ is a set of communication links obtained by reversing all information transfer directions in the directed communication topology.

For each mirror network, according to the following formula:

$$\lambda_2(L(\hat{G})) = \min_{\substack{x \neq 0 \\ 1^T x = 0}} \frac{x^T L(\hat{G}) x}{\|x\|^2} \quad \text{formula (3)}$$

the algebraic connectivity $\lambda_2(L(\hat{G}))$ corresponding to each mirror network is obtained; where x represents a state variable of each distributed generation, and $L(\hat{G})$ is a Laplacian matrix of the undirected mirror graph $\hat{G}$, and the $L(\hat{G})$ can be obtained according to the following formula:

$$L(\hat{G}) = \tfrac{1}{2}(L + L^T) = \Delta - \tfrac{1}{2}(A + A^T) = \hat{\Delta} - \hat{A} \quad \text{formula (4)}$$

where L is a Laplacian matrix of the directed graph G, $\Delta$ is a diagonal matrix, and its diagonal element $\Delta_{ii}$ represents an out-degree of the distributed generation i in the directed communication topology.

For each mirror network, according to the following formula:

$$\text{Length} = \Sigma_{i,j=1}^{n} \operatorname{sgn}(\hat{a}_{ij}) \quad \text{formula (5)}$$

the communication cost corresponding to each mirror network is obtained.

The higher the algebraic connectivity is, the better the network convergence performance will be, meanwhile, on the premise that the specified convergence indicator is met, the shorter the communication link is, the lower the communication cost will be. Therefore, based on the algebraic connectivity and communication cost introduced above, for each candidate topology that meets the specified convergence performance requirement, the following formula is used to calculate a performance indicator based on a weighted sum of the algebraic connectivity and the communication cost.

$$J(L) = \gamma_1 \lambda_2(L(\hat{G})) + \gamma_2 \text{Length} \quad \text{formula (6)}$$

After the performance indicator J(L) corresponding to each candidate topology is obtained, the candidate directed distributed topology corresponding to the maximum performance indicator is selected as the optimal distributed directed communication topology of the micro-grid, and then step C is proceeded; where $\lambda_2(L(\hat{G}))$ represents the algebraic connectivity corresponding to the candidate topology, and Length represents the communication cost corresponding to the candidate topology.

Step C, for the optimal communication topology obtained in step B, pinned distributed generation sets corresponding to different pinning numbers are solved based on global propagation rates and out-degrees, and then step D is proceeded.

In step C above, for a pinned set including k distributed generations and one distributed generation in the corresponding unpinned set, according to the following formula:

$$\begin{cases} P_{k+1} = P_k \cup \{i\} \\ I_{k+1} = I_k \setminus \{i\} \end{cases} \quad \text{formula (7)}$$

a candidate pinned set including (k+1) distributed generations and a corresponding unpinned set are obtained; where $\Pi_k$ represents the pinned set including k distributed generations, $I_k$ represents the unpinned set corresponding to the pinned set $\Pi_k$ which comprises k distributed generations, and i represents one distributed generation in the unpinned set.

For each candidate pinned set including (k+1) distributed generations, according to the following formula:

$$\sum_{i \in P_{k+1}} \sum_{j \in I_{k+1}} \frac{1}{l(i,j)}\bigg|_{\vec{d}(i)} \quad \text{formula (8)}$$

the global propagation rate corresponding to each candidate pinned set is obtained; where $l(i,j)|_{\vec{d}(i)}$ represents the length of the shortest communication path from the distributed generation i to the distributed generation j.

For each candidate pinned set including (k+1) distributed generations, according to the following formula:

$$deg(P_{k+1}) = \sum_{j \in P_{k+1}} \sum_{i \in I_{k+1}} a_{ij} \quad \text{formula (9)}$$

the out-degree corresponding to each candidate pinned set is obtained.

The larger the out-degree and global propagation rate of the pinned set is, the better the corresponding network convergence performance will be, so for each candidate pinned set including (k+1) distributed generations, an objective function value is calculated based on a sum of the global propagation rate and an out-degree of the pinned set according to the following formula.

$$f(P_{k+1}) = deg(P_{k+1}) + \sum_{j \in I_{k+1}} \sum_{\vec{d}(P_{k+1})} \frac{1}{l(P_{k+1}, j)} \quad \text{formula (10)}$$

After the objective function value $f(P_{k+1})$ corresponding to each candidate pinned set is obtained, the candidate pinned set corresponding to the maximum objective function value is selected as the optimal pinned distributed generation set with a pinning number (k+1). and then step D is proceeded; where $deg(P_{k+1})$ represents the out-degree of the candidate pinned set, $l(P_{k+1}, j)$ represents the length of the communication path from the candidate pinned set to the unpinned distributed generation j, and when there are multiple communication paths, a shorter path is preferred.

Step D, a distributed secondary voltage control of the micro-grid is established based on the optimal distributed directed communication network and pinned distributed generation set of the micro-grid, to achieve accurate reactive power sharing and average voltage restoration.

Based on the optimal distributed directed communication network and pinned distributed generation set obtained in the above steps, the local controller of each distributed generation in the micro-grid adopts droop control, and a distributed secondary voltage control of the micro-grid is established based on the theory of pinning consensus, to achieve accurate reactive power sharing and average voltage restoration.

The control process of the i-th pinned distributed generation is shown in formula (11):

$$\begin{cases} \Delta \dot{Q}_{refi} = \sum_{j \in N_i} w_{ij}(\Delta Q_{refj} - \Delta Q_{refi}) - d_i(\Delta Q_{refi} - \Delta Q_c) \\ Q_{DGi}^{min} \leq (\Delta Q_{refi} + Q_{DGi}) \leq Q_{DGi}^{max} \end{cases} \quad (11)$$

In the formula, i=1, 2, . . . , n, j=1, 2, . . . , n; $\Delta Q_{ref,i}$ represents a reactive power increment of the i-th distributed generation; $\Delta Q_{refj}$ represents a reactive power increment of the j-th distributed generation; $\Delta Q_c$ represents a preset consensus convergence equilibrium based on pinning voltage control; $w_{ij}$ represents a communication coupling weight between the i-th distributed generation and the j-th distributed generation; if the i-th distributed generation communicates with the j-th distributed generation, $w_{ij} \neq 0$, otherwise, $w_{ij}=0$. $N_i$ represents a set of neighbor nodes of node i; and $d_i$ represents a pinning control gain.

Figure 2:
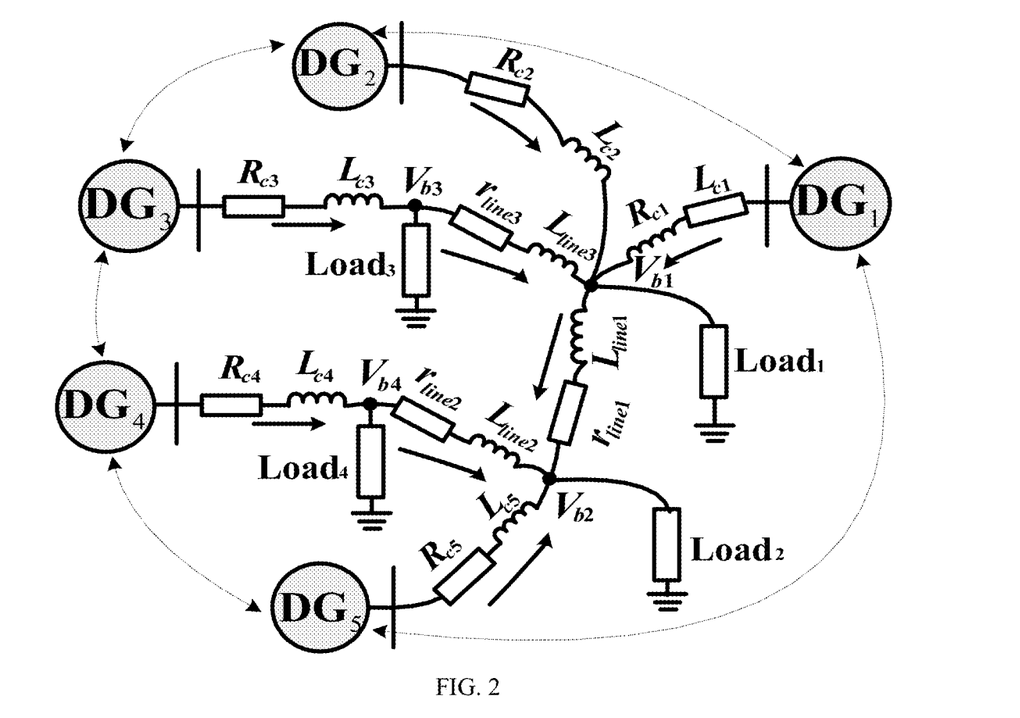
FIG. 2 is the micro-grid simulation system used in an embodiment of the present invention.

The above designed technical solution is applied to practice, and the simulation system is shown in FIG. 2. The micro-grid consists of 5 distributed generations, $DG_1$, $DG_2$ and $DG_3$ are connected to voltage bus 1 through their respective connection impedances, and a local load is connected to $DG_3$; $DG_4$ and $DG_5$ are connected to voltage bus 2 through their respective connection impedances, and a local load is connected to DG4. The rated active and reactive power capacities of the 5 distributed generations are equal, and the impedance type loads are adopted in the system. Communication topologies are designed and selected according to the method for designing a distributed communication topology of a micro-grid in the embodiment of the present invention, and a simulation model of the micro-grid is built based on a MATLAB/Simulink platform to simulate the control effect under each communication topology so as to verify the effectiveness of the method proposed in the present invention.

Figure 3A:
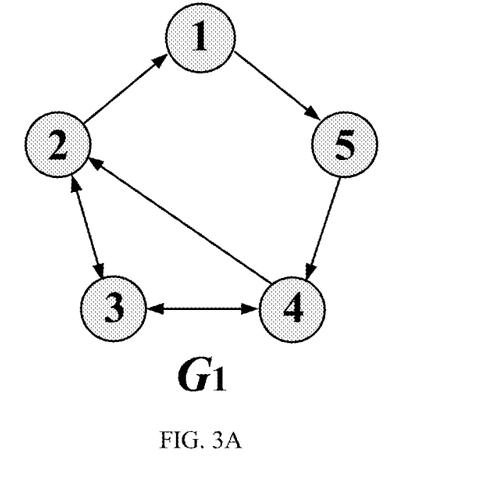
FIG. 3A is the diagram of a $G_1$ type distributed communication topology used in the micro-grid according to an embodiment of the present invention.
Figure 3B:
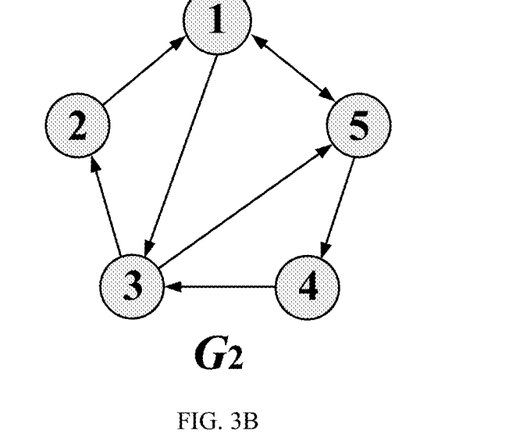
FIG. 3B is the diagram of a $G_2$ type distributed communication topology used in the micro-grid according to an embodiment of the present invention.
Figure 3C:
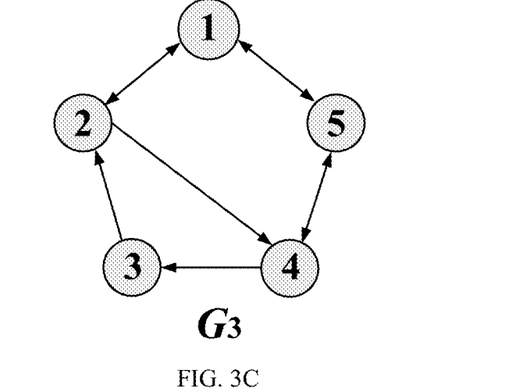
FIG. 3C is the diagram of a $G_3$ type distributed communication topology used in the micro-grid according to an embodiment of the present invention.
Figure 3D:
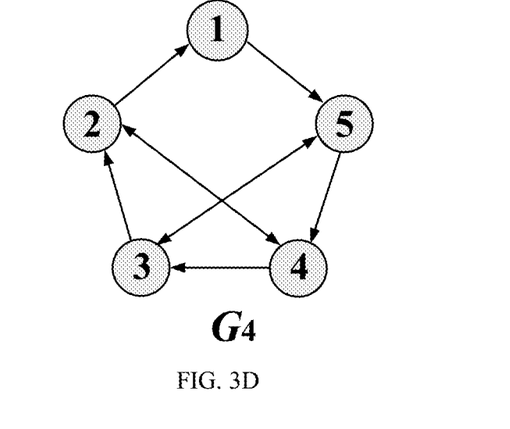
FIG. 3D is the diagram of a $G_4$ type distributed communication topology used in the micro-grid according to an embodiment of the present invention.
Figure 3E:
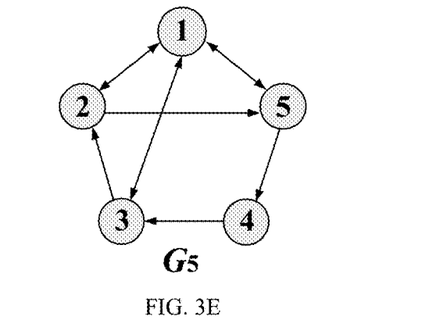
FIG. 3E is the diagram of a $G_5$ type distributed communication topology used in the micro-grid according to an embodiment of the present invention.
Figure 3F:
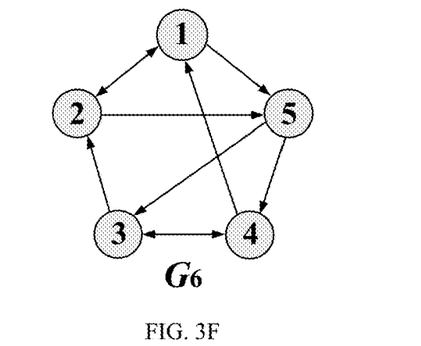
FIG. 3F is the diagram of a $G_6$ type distributed communication topology used in the micro-grid according to an embodiment of the present invention.
Figure 3G:
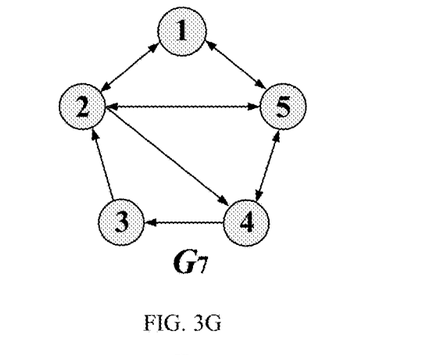
FIG. 3G is the diagram of a $G_7$ type distributed communication topology used in the micro-grid according to an embodiment of the present invention.
Figure 3H:
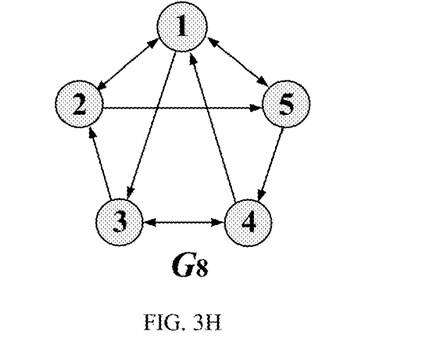
FIG. 3H is the diagram of a $G_8$ type distributed communication topology used in the micro-grid according to an embodiment of the present invention.

FIGS. 3A to 3H show diagrams of 8 distributed communication topologies that satisfy topology connectivity in this embodiment. FIG. 3A is the diagram of a $G_1$ type communication topology used in the embodiment of the present invention; FIG. 3B is the diagram of a $G_2$ type communication topology used in the embodiment of the present invention; FIG. 3C is the diagram of a $G_3$ type communication topology used in the embodiment of the present invention; FIG. 3D is the diagram of a $G_4$ type communication topology used in the embodiment of the present invention; FIG. 3E is the diagram of a $G_5$ type communication topology used in the embodiment of the present invention; FIG. 3F is the diagram of a $G_6$ type communication topology used in the embodiment of the present invention; FIG. 3G is the diagram of a $G_7$ type communication topology used in the embodiment of the present invention; and FIG. 3H is the diagram of a $G_8$ type communication topology used in the embodiment of the present invention. According to the distributed communication topology optimization performance indicators proposed in the present invention, the algebraic connectivity and the number of links of the 8 topologies are shown in Table 1 below. $G_1$, $G_3$, and $G_7$ are selected as example topologies for simulation. It can be seen that the distributed communication topology $G_7$ corresponds to the optimal dynamic convergence, followed by $G_3$, and $G_1$ corresponds to the poor dynamic convergence.

TABLE 1

| Pattern | Connectivity | Number of links |
|---|---|---|
| $G_1$ | 0.7753 | 8 |
| $G_2$ | 0.8820 | 8 |
| $G_3$ | 1 | 9 |
| $G_4$ | 1.1044 | 9 |
| $G_5$ | 1.09 | 10 |
| $G_6$ | 1.5 | 10 |
| $G_7$ | 1.2192 | 11 |
| $G_8$ | 1.6044 | 11 |

Figure 4A:
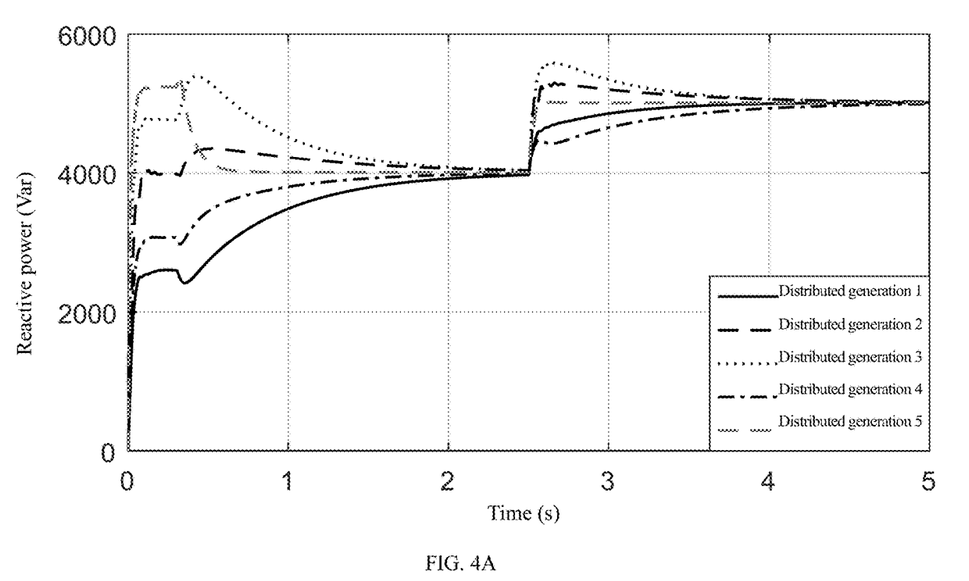
FIG. 4A is the control effect diagram of output reactive power of the micro-grid using the $G_1$ type communication topology.
Figure 4B:
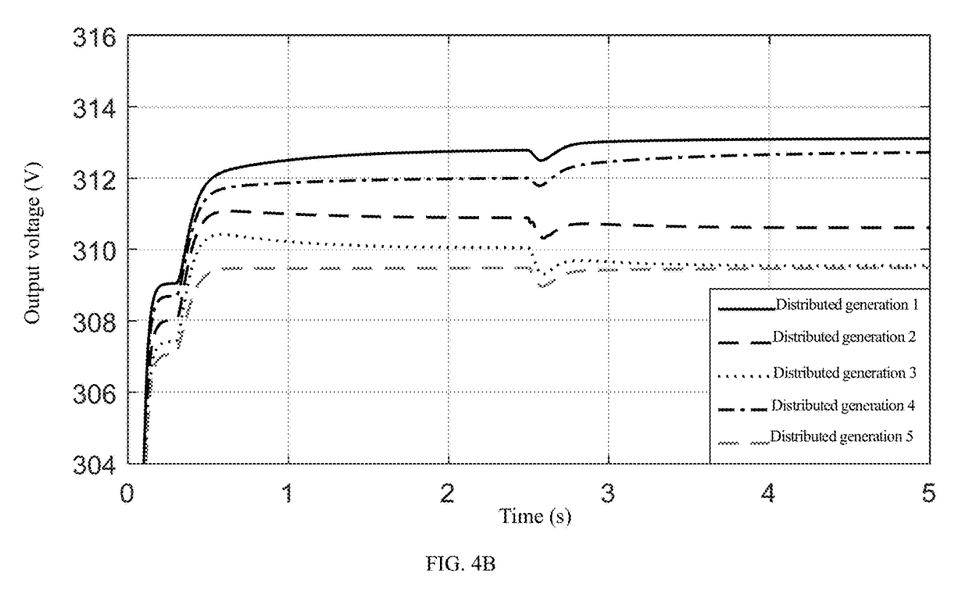
FIG. 4B is the control effect diagram of output voltage of the micro-grid using the $G_1$ type communication topology.

FIGS. 4A and 4B show the simulation results of the micro-grid in this embodiment using the $G_1$ communication topology. Each distributed generation operates in a droop control mode at the beginning, secondary voltage control is activated at 0.3 second, and the load increases at 2.5 seconds. The simulation results are shown in FIGS. 4A and 4B. FIG. 4A is the curve of reactive power output by each distributed generation in the micro-grid, the abscissa represents time in units of seconds, and the ordinate represents reactive power in units of var. As shown in FIG. 4A, the reactive power sharing between distributed generations is not ideal initially under the effect of droop control, however, after 0.3 second, the reactive power tends to be gradually equally allocated under the effect of secondary control, and the system is stable at about 2.5 seconds. Then, the load of the system increases at 2.5 seconds and the reactive power output by each distributed generation increases, whereas the system is stable at about 5 seconds and achieves power equipartition again. FIG. 4B is the curve of voltage output by each distributed generation in the micro-grid, the abscissa represents time in units of seconds, and the ordinate represents output voltage in units of volts. It can be seen from FIG. 4B that the output voltages of the distributed generations deviate from the rated value initially under the effect of droop control, correspondingly, the average output voltage is lower than the rated value, whereas the output voltage increases after 0.3 second under the effect of secondary control so that the average output voltage of the micro-grid reaches the rated value, the system is stable at about 2.5 seconds. Then, the output voltages of the distributed generations decrease due to the increase of system load at 2.5 seconds, and the system is stable again at about 5 seconds, with the average output voltage increasing to the rated value.

Figure 5A:
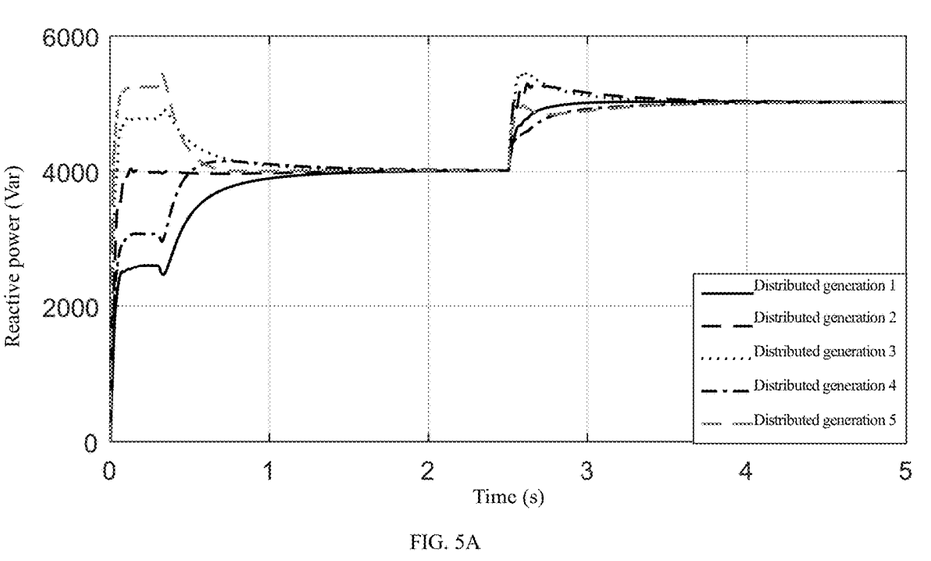
FIG. 5A is the control effect diagram of output reactive power of the micro-grid using the $G_4$ type communication topology.
Figure 5B:
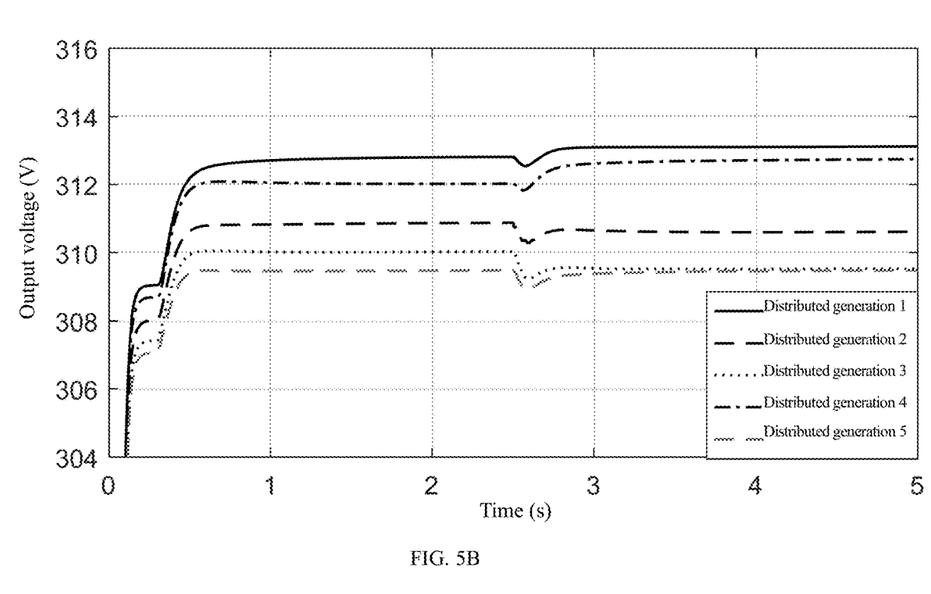
FIG. 5B is the control effect diagram of output voltage of the micro-grid using the $G_4$ type communication topology.

FIGS. 5A and 5B show the simulation results of the micro-grid in this embodiment using the $G_2$ communication topology. Each distributed generation operates in a droop control mode at the beginning, and secondary voltage control is activated at 0.3 second. The simulation results are shown in FIGS. 5A and 5B. FIG. 5A is the curve of reactive power output by each distributed generation in the micro-grid, the abscissa represents time in units of seconds, and the ordinate represents reactive power in units of var. As shown in FIG. 5A, the reactive power sharing between distributed generations is not ideal initially under the effect of droop control, however, after 0.3 second, the reactive power tends to be gradually equally allocated under the effect of secondary control, and the system is stable at about 1.7 seconds. Then, the load of the system increases at 2.5 seconds and the reactive power output by each distributed generation increases, whereas the system is stable at about 3.8 seconds and achieves power equipartition again. FIG. 5B is the curve of voltage output by each distributed generation in the micro-grid, the abscissa represents time in units of seconds, and the ordinate represents output voltage in units of volts. It can be seen from FIG. 5B that the output voltages of the distributed generations deviate from the rated value initially under the effect of droop control, correspondingly, the average output voltage is lower than the rated value, whereas the output voltage increases after 0.3 second under the effect of secondary control so that the average output voltage of the micro-grid reaches the rated value, the system is stable at about 1.7 seconds. Then, the output voltages of the distributed generations decrease due to the increase of system load at 2.5 seconds, and the system is stable again at about 3.8 seconds, with the average output voltage increasing to the rated value.

Figure 6A:
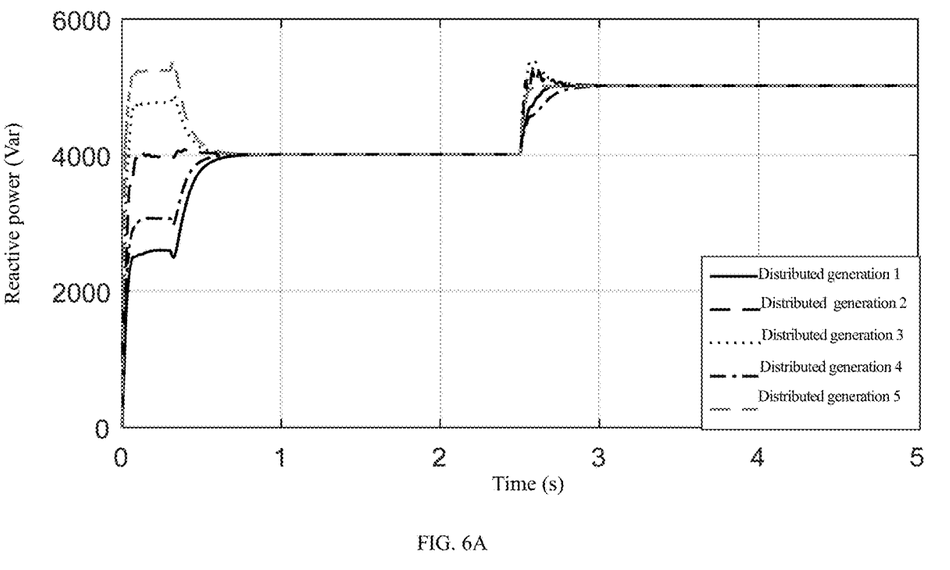
FIG. 6A is the control effect diagram of output reactive power of the micro-grid using the $G_7$ type communication topology.
Figure 6B:
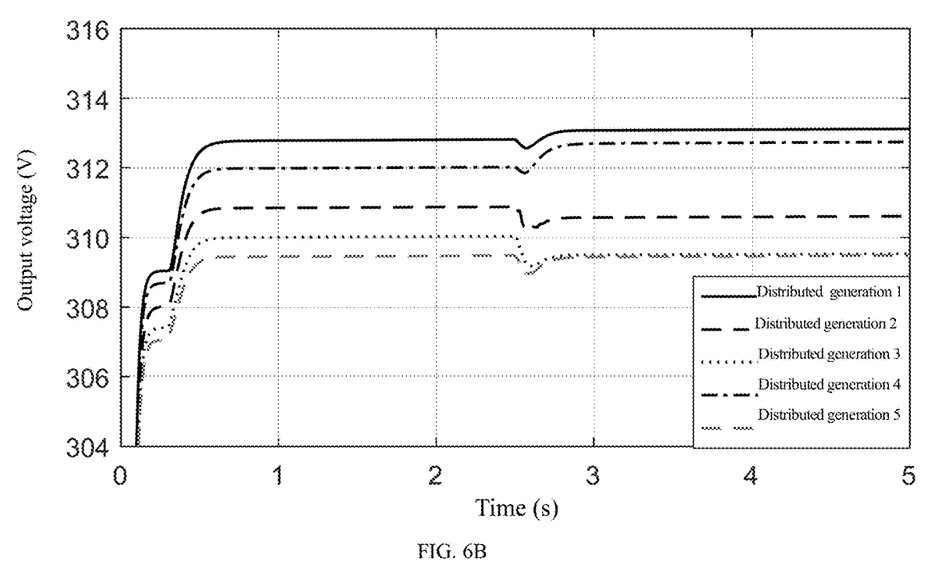
FIG. 6B is the control effect diagram of output voltage of the micro-grid using the $G_7$ type communication topology.

FIGS. 6A and 6B show the simulation results of the micro-grid in this embodiment using a distributed all-pass communication topology. Each distributed generation operates in a droop control mode at the beginning, and secondary voltage control is activated at 0.3 second. The simulation results are shown in FIGS. 6A and 6B. FIG. 6A is the curve of reactive power output by each distributed generation in the micro-grid, the abscissa represents time in units of seconds, and the ordinate represents reactive power in units of var. As shown in FIG. 6A, the reactive power sharing of the distributed generations is not ideal initially under the effect of droop control, however, after 0.3 second, the reactive power tends to be gradually equally allocated under the effect of secondary control, and the system is stable at about 0.8 second. Then, the load of the system increases at 2.5 seconds and the reactive power output by each distributed generation increases, whereas the system is stable at about 3 seconds and achieves power equipartition again. FIG. 6B is the curve of voltage output by each distributed generation in the micro-grid, the abscissa represents time in units of seconds, and the ordinate represents output voltage in units of volts. It can be seen from FIG. 6B that the output voltages of the distributed generations deviate from the rated value initially under the effect of droop control, correspondingly, the average output voltage is lower than the rated value, whereas the output voltage increases after 0.3 second under the effect of secondary control so that the average output voltage of the micro-grid reaches the rated value, the system is stable at about 0.8 second. Then, the output voltages of the distributed generations decrease due to the increase of system load at 2.5 seconds, and the system is stable again at about 3 seconds, with the average output voltage increasing to the rated value.

From FIGS. 4A, 4B, 5A, 5B, 6A and 6B, it can be seen that the $G_7$ type communication topology can achieve the optimal convergence performance, followed by the $G_3$ type topology, and the $G_1$ type topology is the worst, which is consistent with the analysis results of the method for designing the distributed communication topology of the micro-grid based on network mirroring proposed in the present invention.

As for the selection of pinning nodes, the value of objective function corresponding to each single pinning node is calculated as $f(DG_2)=9.75>f(DG_5)=9.5>f(DG_1)=6.67>f(DG_4)=6.37>f(DG_3)=3.5$. It indicates that the pinned node $DG_2$ corresponds to the optimal dynamic convergence, followed by the pinned nodes $DG_5$, $DG_1$, and $DG_4$, and the pinned node $DG_3$ corresponds to a poor dynamic convergence.

Figure 7A:
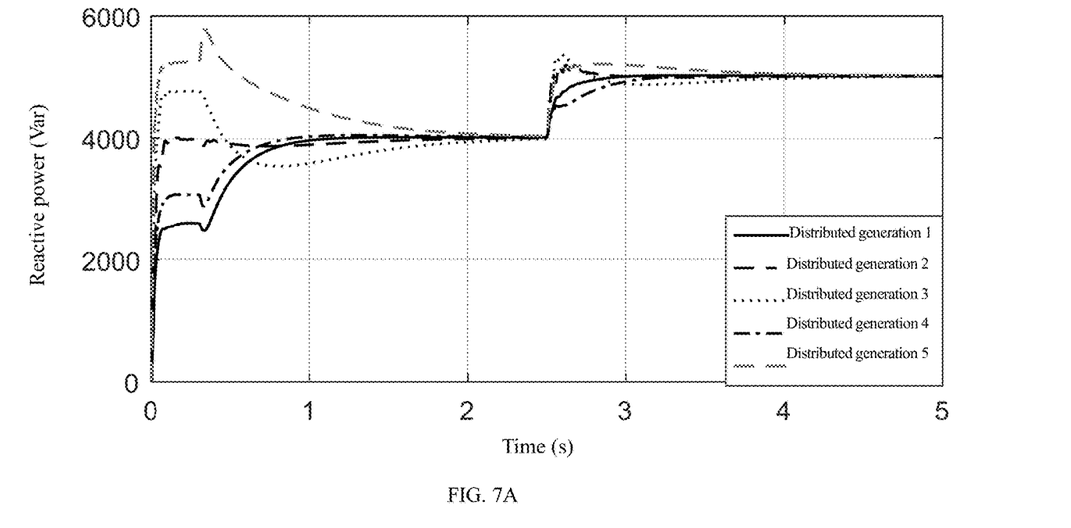
FIG. 7A is the control effect diagram of output reactive power of the micro-grid appointing $DG_5$ as the pinned node under the $G_7$ type communication topology.
Figure 7B:
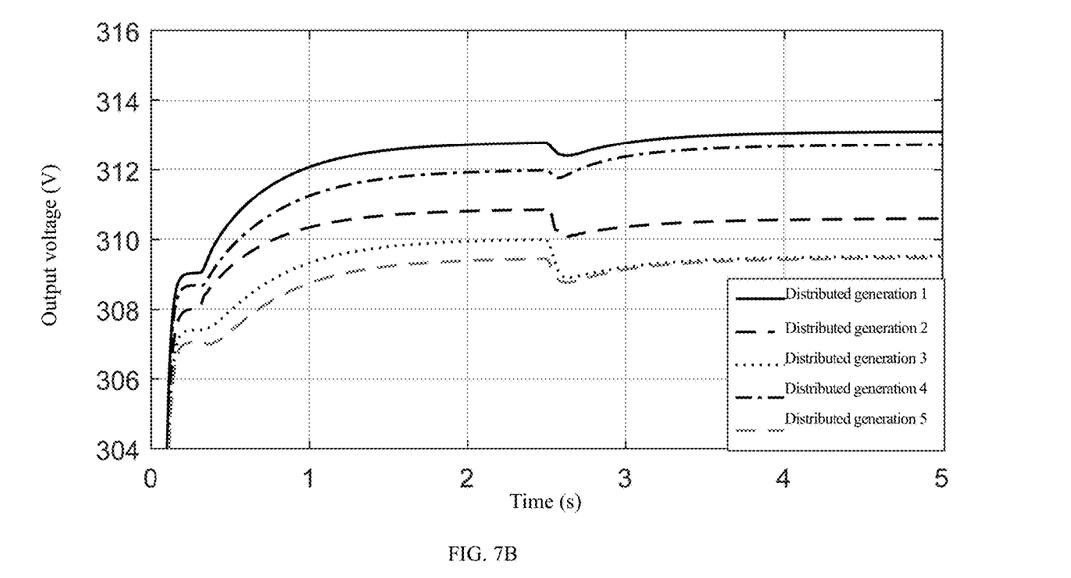
FIG. 7B is the control effect diagram of output voltage of the micro-grid appointing $DG_5$ as the pinned node under the $G_7$ type communication topology.

FIGS. 7A and 7B show the simulation results of the micro-grid in this embodiment appointing the $DG_3$ as the pinned node under the $G_7$ type distributed communication topology. Each distributed generation operates in the droop control mode at the beginning, secondary voltage control is activated at 0.3 second, and the load increases at 2.5 seconds. The simulation results are shown in FIGS. 7A and 7B. FIG. 7A is the curve of reactive power output by each distributed generation in the micro-grid, the abscissa represents time in units of seconds, and the ordinate represents reactive power in units of var. As shown in FIG. 7A, the reactive power sharing of the distributed generations is not ideal initially under the effect of droop control, however, after 0.3 second, the reactive power tends to be gradually equally allocated under the effect of secondary control, and the system is stable at about 2.5 seconds. Then, the load of the system increases at 2.5 seconds and the reactive power output by each distributed generation increases, whereas the system is stable at about 5 seconds and achieves power equipartition again. FIG. 7B is the curve of voltage output by each distributed generation in the micro-grid, the abscissa represents time in units of seconds, and the ordinate represents output voltage in units of volts. It can be seen from FIG. 7B that the output voltages of the distributed generations deviate from a rated value initially under the effect of droop control, correspondingly, the average output voltage is lower than the rated value, whereas the output voltage increases after 0.3 second under the effect of secondary control so that the average output voltage of the micro-grid reaches the rated value, the system is stable at about 2.5 seconds. Then, the output voltages of the distributed generations decrease due to the increase of system load at 2.5 seconds, and the system is stable again at about 5 seconds, with the average output voltage increasing to the rated value.

Figure 8A:
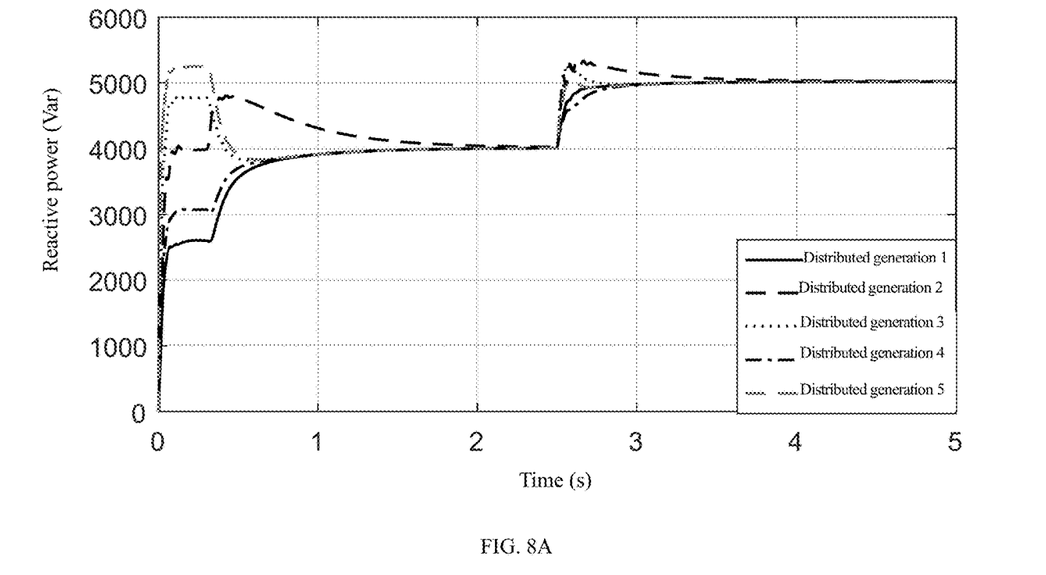
FIG. 8A is the control effect diagram of output reactive power of the micro-grid appointing $DG_2$ as the pinned node under the $G_7$ type communication topology.
Figure 8B:
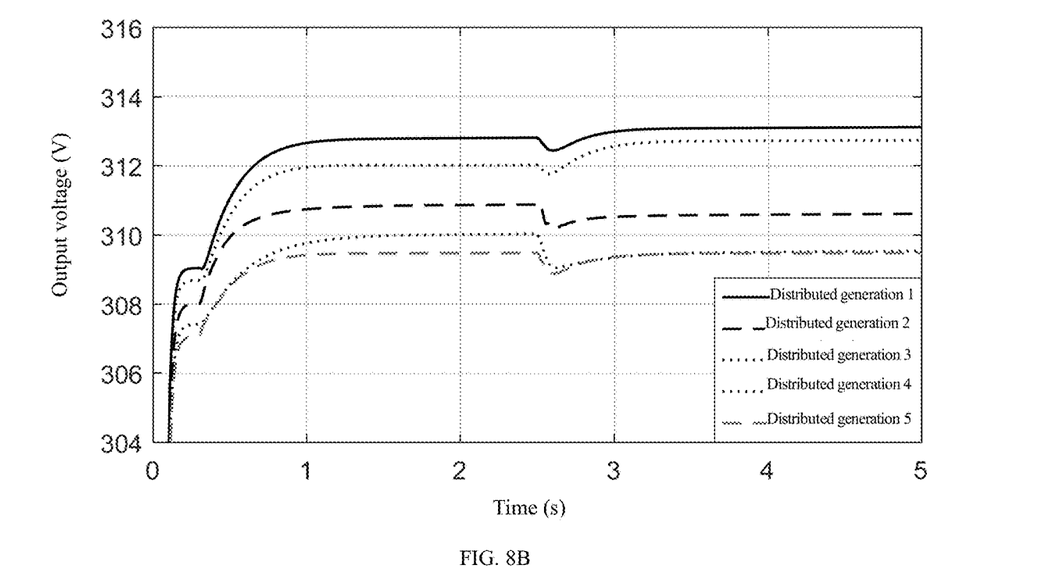
FIG. 8B is the control effect diagram of output voltage of the micro-grid appointing $DG_2$ as the pinned node under the $G_7$ type communication topology.

FIGS. 8A and 8B show the simulation results of the micro-grid in this embodiment appointing $DG_2$ as the pinned node under the $G_7$ type distributed communication topology. Each distributed generation operates in a droop control mode at the beginning, secondary voltage control is activated at 0.3 second, and the load increases at 2.5 seconds. The simulation results are shown in FIGS. 8A and 8B. FIG. 8A is the curve of reactive power output by each distributed generation in the micro-grid, the abscissa represents time in units of seconds, and the ordinate represents reactive power in units of var. As shown in FIG. 8A, the reactive power sharing of the distributed generations is not ideal initially under the effect of droop control, however, after 0.3 second, the reactive power tends to be gradually equally allocated under the effect of secondary control, and the system is stable at about 2 seconds. Then, the load of the system increases at 2.5 seconds and the reactive power output by each distributed generation increases, whereas the system is stable at about 4 seconds and achieves power equipartition again. FIG. 8B is the curve of voltage output by each distributed generation in the micro-grid, the abscissa represents time in units of seconds, and the ordinate represents output voltage in units of volts. It can be seen from FIG. 8B that the output voltages of the distributed generations deviate from the rated value initially under the effect of droop control, correspondingly, the average output voltage is lower than the rated value, whereas the output voltage increases after 0.3 second under the effect of secondary control so that the average output voltage of the micro-grid reaches the rated value, the system is stable at about 2 seconds. Then, the output voltages of the distributed generations decrease due to the increase of system load at 2.5 seconds, and the system is stable again at about 4 seconds, with the average output voltage increasing to the rated value.

According to the method for designing the distributed communication topology of the micro-grid based on network mirroring and global propagation rates proposed by the present invention, the algebraic connectivity of directed distributed communication topologies is associated with the connectivity in graph theory, thereby an optimization indicator considering the dynamic convergence performance of secondary control under the limitation of certain communication cost is established to provide guidance for the design of directed distributed communication topologies; further, on account of that the convergence performance of the pinned node is associated with the global propagation rate, an optimization design indicator considering the out-degree of the pinned node and the global propagation rate is established to provide guidance for the design of pinned nodes. In view of the research gap that the existing distributed secondary control technologies have not investigated the design of directed communication topologies and pinned nodes, the present invention proposes a distributed communication topology design method. As an important part of the secondary control strategy, the method optimizes the control effects of reactive power sharing and average voltage restoration of distributed generations, which in turn improves the dynamic operation performance of the micro-grid effectively.

The embodiments of the present invention are described in detail above with reference to the accompanying drawings, however, the present invention is not limited to the above-mentioned embodiments. Various changes can be made without departing from the purpose of the present invention within the scope of knowledge possessed by those ordinary technicians in this field.

What is claimed is:

1. A method for designing a distributed communication topology of a micro-grid based on a network mirroring and global propagation rates, used to implement information interaction in a droop operation mode of an islanded micro-grid, comprising the following steps:

step A, determining a connectivity of all distributed directed communication networks in the micro-grid, selecting connected distributed directed communication networks as candidate communication networks, and then proceeding to step B;

step B, obtaining mirror networks of the candidate communication networks based on a mirroring operation, obtaining an algebraic connectivity and a communication cost corresponding to each mirror network of the mirror networks, selecting an optimal distributed directed communication topology corresponding to a maximum performance indicator to obtain an optimal distributed directed communication network, and then proceeding to step C;

step C, solving, for the optimal distributed directed communication topology obtained in step B, pinned distributed generation sets corresponding to different pinning numbers based on the global propagation rates and out-degrees, and then proceeding to step D; and step D, establishing a distributed secondary voltage control of the micro-grid based on the optimal distributed directed communication network and the pinned distributed generation sets of the micro-grid, to achieve accurate reactive power sharing and average voltage restoration;

wherein in step C, for each candidate pinned set comprising (k+1) distributed generations, an objective function value is calculated based on a sum of the global propagation rates and an out-degree of the each candidate pinned set, and a candidate pinned set corresponding to a maximum objective function value is selected as an optimal pinned distributed generation set with a pinning number (k+1);

for the each candidate pinned set, according to the following formula:

$$f(P_{k+1}) = deg(P_{k+1}) + \sum_{j \in I_{k+1}} \sum_{\vec{d}(P_{k+1})} \frac{1}{l(P_{k+1}, j)} \quad \text{formula (10)}$$

the objective function value $f(P_{k+1})$ corresponding to the each candidate pinned set is calculated; wherein deg $(P_{k+1})$ represents the out-degree of the each candidate pinned set, $l(P_{k+1}, j)$ represents a length of a communication path from the each candidate pinned set to an unpinned distributed generation j, and when there are multiple communication paths, a shorter path is preferred.

2. The method for designing the distributed communication topology of the micro-grid based on the network mirroring and global propagation rates according to claim 1, wherein in step A, the connected distributed directed communication networks are selected from the all distributed directed communication networks in the micro-grid according to steps A01 and A02 below as the candidate communication networks of the micro-grid:

step A01, for the distributed communication topology, introducing a corresponding connectivity matrix as shown in the following formula:

$$RC = A + A^2 + \ldots + A^n \quad \text{formula (1)}$$

wherein RC represents the corresponding connectivity matrix of the distributed communication topology; □ represents an adjacency matrix of the distributed directed communication topology, and the □ is composed of connecting elements between distributed generations, $\square = [a_{ij}]$; + represents a Boolean sum of the adjacency matrix, and $a_{ij}$ represents a direct communication connectivity from a j-th distributed generation to an i-th distributed generation in the micro-grid; and step A02, obtaining $RC = [r_{ij}]$ based on formula (1), wherein $r_{ij}$ represents a communication connectivity from the j-th distributed generation to the i-th distributed generation in the micro-grid, $r_{ij}=1$ indicates that the communication connectivity presents from the j-th distributed generation to the i-th distributed generation in the micro-grid, and $r_{ij}=0$ indicates that the communication connectivity does not present from the j-th distributed generation to the i-th distributed generation in the micro-grid; if all non-diagonal elements $r_{ij}$ in RC are equal to 1, the distributed directed communication network is a connected network; and if some non-diagonal elements $r_{ij}$ in RC are equal to 0, the distributed directed communication network is an unconnected network.

3. The method for designing the distributed communication topology of the micro-grid based on the network mirroring and global propagation rates according to claim 1, wherein in step B, an undirected mirror counterpart of each candidate communication network is obtained based on the mirroring operation according to steps B01 and B02 below:

step B01, based on a graph theory, using a directed graph $G=(\square, E, \square)$ to represent a topology of the each candidate communication network, wherein □ is a set of distributed generation nodes, E represents a set of communication links in the distributed directed communication network, and □ □ represents a direct connectivity in the distributed directed communication network; and step B02, for the each candidate communication network represented by the directed graph, according to the following formula:

$$\begin{cases} \hat{E} = E \cup \check{E} \\ \hat{A} = [\hat{a}_{ij}], \hat{a}_{ij} = \hat{a}_{ji} = (a_{ij} + a_{ji})/2 \\ \hat{G} = M(G) = (V, \hat{E}, \hat{A}) \end{cases} \quad \text{formula (2)}$$

obtaining the undirected mirror counterpart $\hat{G}$ corresponding to the each candidate communication network; wherein $\check{E}$ is a set of communication links obtained by reversing all information transfer directions in a directed communication topology.

4. The method for designing the distributed communication topology of the micro-grid based on the network mirroring and the global propagation rates according to claim 1, wherein in step B, for the each mirror network, according to the following formula:

$$\lambda_2(L(\hat{G})) = \min_{\substack{x \neq 0 \\ 1^T x = 0}} \frac{x^T L(\hat{G}) x}{\|x\|^2} \quad \text{formula (3)}$$

the algebraic connectivity $\lambda_2(L(\hat{G}))$ corresponding to the each mirror network is obtained; wherein x represents a state variable of each distributed generation, and $L(\hat{G})$ is a Laplacian matrix of the undirected mirror graph $\hat{G}$, and the $L(\hat{G})$ is obtained according to the following formula:

$$L(\hat{G}) = \frac{1}{2}(L+L^T) = \Delta - \frac{1}{2}(A+A^T) = \hat{\Delta} - \hat{A} \quad \text{formula (4)}$$

wherein L is a Laplacian matrix of the directed graph G, $\Delta$ is a diagonal matrix, and a diagonal element $\Delta_{ii}$ of the $\Delta$ represents an out-degree of the distributed generation i in a directed communication topology;

in the meantime, for the each mirror network, according to the following formula:

$$\text{Length} = \sum_{i,j=1}^{n} \text{sgn}(\hat{a}_{ij}) \quad \text{formula (5)}$$

the communication cost corresponding to the each mirror network is obtained.

5. The method for designing the distributed communication topology of the micro-grid based on the network mirroring and the global propagation rates according to claim 1, wherein in step B, for each candidate topology meetings a specified convergence performance requirement, a performance indicator is calculated based on a weighted sum of the algebraic connectivity and the communication cost, and a candidate directed distributed communication topology corresponding to the maximum performance indicator is selected as the optimal distributed directed communication topology of the micro-grid;

aiming at the each candidate topology meeting the specified convergence performance requirement, for each candidate directed distributed topology, according to the following formula:

$$J(L)=\gamma_1\lambda_2(L(\hat{G}))+\gamma_2 \text{Length} \qquad \text{formula (6)}$$

the performance indicator J(L) corresponding to the each candidate topology is obtained, and the candidate directed distributed topology corresponding to the maximum performance indicator is selected as the optimal distributed directed communication topology of the micro-grid, wherein $\lambda_2(L(\hat{G}))$ represents the algebraic connectivity corresponding to the each candidate topology, and Length represents the communication cost corresponding to the each candidate topology.

6. The method for designing the distributed communication topology of the micro-grid based on the network mirroring and the global propagation rates according to claim 1, wherein in step C, for a pinned set comprising k distributed generations and one distributed generation in an unpinned set, according to the following formula:

$$\begin{cases} P_{k+1} = P_k \cup \{i\} \\ I_{k+1} = I_k \,\square\, \{i\} \end{cases} \qquad \text{formula (7)}$$

a candidate pinned set comprising (k+1) distributed generations and a corresponding unpinned set are obtained; wherein $\square_k$ represents the pinned set comprising k distributed generations, $\square_k$ represents the unpinned set corresponding to the pinned set $\square_k$ comprising k distributed generations, and i represents one distributed generation in the unpinned set.

7. The method for designing the distributed communication topology of the micro-grid based on the network mirroring and the global propagation rates according to claim 1, wherein in step C, for a candidate pinned set comprising (k+1) distributed generations, according to the following formula:

$$\sum_{i\in P_{k+1}}\sum_{j\in I_{k+1}} \frac{1}{l(i,j)}\bigg|_{\vec{d}(i)} \qquad \text{formula (8)}$$

the global propagation rate corresponding to each candidate pinned set is obtained; where $l(i,j)|_{\vec{d}(i)}$ represents a length of a shortest communication path from a distributed generation i to a distributed generation j;

in the meantime, for the candidate pinned set comprising (k+1) distributed generations, according to the following formula:

$$deg(P_{k+1}) = \sum_{j\in P_{k+1}}\sum_{i\in I_{k+1}} a_{ij} \qquad \text{formula (9)}$$

the out-degree corresponding to the each candidate pinned set is obtained.

8. The method for designing the distributed communication topology of the micro-grid based on the network mirroring and the global propagation rates according to claim 1, wherein in step C, a pinned distributed generation set $\square_0$ is initialized to an empty set, a corresponding unpinned distributed generation set $\square_0$ is a set of all distributed generations in the communication network, the above operations are cycled with a number of the distributed generations in the pinned set increased each time, and the pinned distributed generation sets corresponding to the different pinning numbers are solved.

* * * * *